United States Patent
Hojnowski

[19]

[11] Patent Number: 5,956,175
[45] Date of Patent: Sep. 21, 1999

[54] SOLAR CONTROL WINDOW FILM

[76] Inventor: Steven L. Hojnowski, 5872 Menorca Dr., San Diego, Calif. 92124

[21] Appl. No.: 09/127,311

[22] Filed: Jul. 31, 1998

[51] Int. Cl.[6] ................................. G02B 5/22; G02B 5/26
[52] U.S. Cl. .............................................. 359/360; 359/361
[58] Field of Search ..................... 359/360, 361, 359/350, 885, 890, 891; 428/216, 430, 34, 458

[56] References Cited

U.S. PATENT DOCUMENTS

| | | | |
|---|---|---|---|
| 3,682,528 | 8/1972 | Apfel et al. | 350/1 |
| 3,775,226 | 11/1973 | Windorf | 428/216 |
| 3,899,621 | 8/1975 | Willdorf | 428/216 |
| 4,045,125 | 8/1977 | Farges | 350/166 |
| 4,226,910 | 10/1980 | Dahlen et al. | 428/336 |
| 4,337,990 | 7/1982 | Fan et al. | 350/1.7 |
| 4,368,945 | 1/1983 | Fujimori et al. | 359/586 |
| 4,590,118 | 5/1986 | Yatabe et al. | 428/519 |
| 4,799,745 | 1/1989 | Meyer et al. | 359/360 |
| 4,978,181 | 12/1990 | Inanuma et al. | 350/1.7 |
| 5,024,923 | 6/1991 | Suzuki et al. | 359/885 |
| 5,071,206 | 12/1991 | Hood et al. | 359/360 |
| 5,306,547 | 4/1994 | Hood et al. | 359/360 |
| 5,377,045 | 12/1994 | Wolfe et al. | 359/360 |
| 5,393,443 | 2/1995 | Satake et al. | 252/62 |
| 5,449,426 | 9/1995 | Lin | 156/101 |
| 5,693,415 | 12/1997 | Zait et al. | 428/332 |

OTHER PUBLICATIONS

Azurlite® Glass Solar Control Window System, PPG Industries, Inc. 3 pages, Feb. 1994.
LOF High–Performance Tinted Float Glass, Libby–Owens–Ford Co., 5 pages, Apr. 1996.

*Primary Examiner*—Jon Henry
*Attorney, Agent, or Firm*—Juettner Pyle Piontek & Underwood

[57] ABSTRACT

A solar control window film having high visible light transmission and low transmission of near infrared heat energy is comprised of a transparent substrate bearing a thin, optically transparent layer of metal, an optically transparent layer of near infrared energy absorbing material and a transparent layer of protective material overlying and protecting the near infrared energy absorbing material and the metal. The near infrared reflecting properties and the near infrared absorbing properties of the respective layers are balanced to provide selective solar heat rejection without excessive transfer of heat into the window glass or glazing material.

15 Claims, 3 Drawing Sheets

SOLAR CONTROL WINDOW FILM

FIELD OF THE INVENTION

The present invention relates to solar control window films having selective transmission of solar energy spectra, particularly films having high visible light transmission and low transmission of near-infrared heat energy.

BACKGROUND

A conventional form of solar control window film consists of a substantially transparent flexible polymer substrate having a thin layer of reflective metal deposited thereon, for example, by vapor deposition or sputter deposition. The film is customarily affixed to the interior surface of a window by a substantially transparent layer of pressure sensitive adhesive. The adhesive customarily contains ultraviolet energy absorbers to protect from ultraviolet damage the contents of the room or space in which the window is located.

Depending upon the selection of the metal or metals and the thickness of the metal layer, the film will have a selected visible light transmission (VLT) and a selected visual light reflection (VLR). In general, VLT and VLR are inversely proportional. If the thickness of the metal layer is increased, VLR is increased and VLT is decreased. In order to achieve an acceptable level of solar energy rejection in most climates, the metal layer must be sufficiently thick and dense that visible light transmission is below 50%, frequently 25% or less. Thus, VLT and VLR become competing interests without a middle of the road compromise acceptable to the industry.

One attempt to increase the VLT of metalized films has been to apply coatings of titanium oxide or indium tin oxide adjacent the film or layer of metal to control reflection within a narrow spectral band. According to classic optics, sandwiching of the metal film between layers of a material of high refractive index can boost visible transmission, that is, so-called induced transmission. In common practice, this requires 70 to 100 nanometer thick layers of titanium oxide or indium tin oxide, which are very slow to produce and difficult to control. As a result, this approach is generally too expensive to be practical for many window film applications.

U.S. Pat. No. 4,799,745 (Reexamination Certificate B1 4799745) discloses an infrared reflecting film employing Fabry-Perot interference filters comprised of five or more odd numbers of alternating layers of dielectric and metal; specifically, two or more optically transparent layers of metal, such as silver, gold, platinum, palladium, aluminum, copper, nickel and alloys thereof, sandwiched between and separated by directly contiguous dielectric spacer layers, which may suitably be the oxides of indium, tin, titanium, silicon, chromium and bismuth. Related U.S. Pat. No. 5,071,206, which issued on a continuation in part of U.S. Pat. No. 4,799,745, discloses a color corrected infrared reflecting film comprised of a substrate bearing seven directly contiguous alternating layers of dielectric and silver. While these films provide the desired visible light transmission, they require 5, 7 or a greater odd number of layers of material sputter deposited onto one another, which is very costly and not easy to achieve.

The basis for the approach of U.S. Pat. No. 4,799,745, and also of U.S. Pat. Nos. 5,071,206, 4,337,990 and 3,682,528, is to maximize infrared reflection which, when the film is affixed to a window or employed in a glazing system, causes the reflected infrared energy, i.e., the solar heat, to be absorbed in the rigid support material, namely the window glass. Excessive absorption of solar heat can result in breakage of the glass. Another disadvantage of this approach is the inherently low moisture vapor transmission rate (MVTR) of the metal/dielectric stack, which typically results in excessively long drying times for the pressure sensitive adhesive attachment or installation system employed to affix the film to a window. In many cases, this can result in fogginess or haze and disrupt window aesthetics after installation.

Another approach to selective filtering of the solar spectrum has been through the use of near infrared absorbing dyes. One example is a film incorporating or coated with infrared absorbing dyes that is available from Nippon Kayaku Kabushiki Kaisha of Japan. Primary glass manufacturers also employ inorganic oxides to absorb solar heat. Examples include PPG Industries "Azurelite" glass and Libby Owens Ford "Evergreen" glass. Again, due to solar heat absorption, very high glazing temperatures are reached, promoting glass breakage, decreasing dual pane insulated glass lifetime, causing sealant failure, and producing an overall inefficient system.

SUMMARY OF THE INVENTION

The object of the present invention is to provide a balanced approach to optimizing the degree of solar heat transfer from the exterior to the interior of a space to be protected from solar energy, such as a residential or commercial interior environment; thereby to provide an improved solar control window film overcoming the described disadvantages of the prior art.

A particular object of the invention is to achieve a balance between reflectance and absorption of near infrared heat energy, thereby to control dissipation of solar heat without excessive reflectance or excessive absorption, and in turn to control the degree of solar heat transfer to the glazing material, i.e., the window glass.

It is also an object of the invention to factor visible light transmission into the balance thereby to provide a solar control window film having high visible light transmission and excellent solar heat rejection.

The window film of the invention is cost effective to manufacture, produces superior solar properties, such as low shading coefficient and high visible transmittance, and does not cause excessive heat transfer to the window glass.

This balance between reflection and absorption can be tailored to specific terrestrial environments. In preferred embodiments, a metallic layer is magnetron sputter-deposited onto a substrate, enabling precise control of metal thickness and facilitating use of a wide range of metal targets. The use of dielectric spacer layers is not necessary.

In additional embodiments, the invention may comprise thicker caliper composite structures which will provide both the desired solar control and the safety benefits commonly associated with architectural safety glazing materials, including shatter resistance, burglary deterrence, blast and ballistic resistance, and the mitigation of natural phenomena such as high winds, wind borne debris, and rain/water damage.

In accordance with the present invention, the balance between reflectance and absorption is struck within a narrow band of the near infrared (NIR) solar energy interval. Solar heat is derived principally from the near infrared energy interval, with about 71% of the weighted spectral power distribution occuring within a narrow band of from about 800 to about 1100 nanometers (nm). It is within this narrow band that the balance is struck.

The window film of the invention is comprised of a substantially transparent substrate bearing thereon an optically transparent thin film coating or layer of reflective metal or metals and an optically transparent layer of near infrared NIR energy absorbing material. The metal or metals employed and the thickness of the metal coating are selected and/or adjusted in such manner that the metal coating has selected transmission in the visible light spectrum and selected reflectance in the visible light and NIR energy spectra. The thickness of the layer of NIR energy absorbing material and/or the concentration of NIR energy absorbing matter dispersed in the layer is selected and/or adjusted in such manner as to have selected absorption of solar heat energy within the NIR energy spectrum, specifically within the narrow band of from about 800 to about 1100 nm. A desired balance can thereby be achieved between NIR energy reflectance, NIR energy absorption and NIR and visible light transmission.

In one physical structure provided in accordance with the invention, a substrate having a layer of metal on one side thereof is adhesively laminated to a clear polymer sheet so that the sheet overlies and protects the metal layer. The exposed surface of the polymer sheet bears a scratch resistance protective hard coat and the exposed, i.e. other, side of the substrate bears a pressure sensitive adhesive for affixing the substrate to a window. In this structure, the NIR energy absorbing material may optionally be incorporated in one or more of the following manners: Dispersed in the pressure sensitive adhesive; incorporated in or coated onto the substrate; dispersed in the laminating adhesive; incorporated in or coated onto the polymer sheet; dispersed in the hard coat material; and/or applied to the substrate as a prime coat under the metal layer and/or to the polymer sheet as a prime coat under the hard coat.

In a first preferred embodiment of the invention, having the structure above described, the NIR energy absorbing material comprises NIR energy absorbing dyes dispersed or dissolved in an adhesive matrix, with the adhesive matrix serving to laminate the protective sheet of clear polymer to the metal coated substrate. In a second preferred embodiment, the NIR energy absorbing material is coated onto the clear polymer sheet and the sheet is laminated to the metallized surface of the substrate with the NIR energy absorbing layer facing the metal layer. In order to obtain optimum results with these two embodiments of the invention, the window film is affixed to the interior surface of a window with the substrate adjacent the window glass and the layer of NIR energy absorbing material facing away from the glass and into the interior of the room or other space.

In other embodiments of the invention, the clear polymer sheet and laminating adhesive may be omitted and the NIR energy absorbing material incorporated in the remaining elements of the structure.

The window film of the invention is therefore cost effective to produce, provides excellent solar control, mitigates against glass breakage by preventing excessive accumulation of solar heat in the glass, and provides for high visible light transmission, specifically a VLT of at least about 50%, and preferably up to about 80%.

These and other objects and advantages of the invention will become apparent from the following detailed description as considered in conjunction with the accompanying drawings.

DETAILED DESCRIPTION Of PREFERRED EMBODIMENTS

Figure 1:
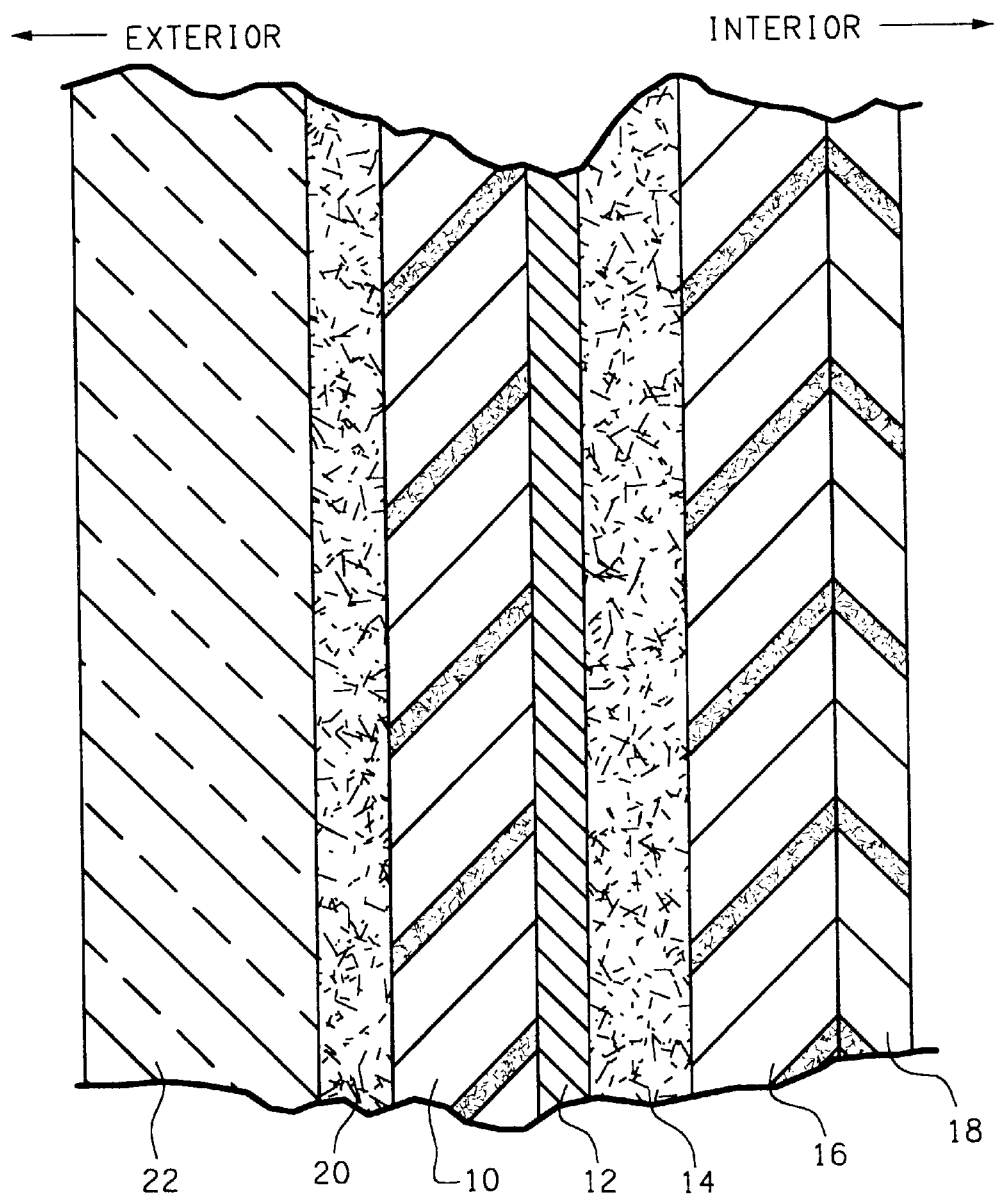
FIG. 1 is a cross section, on a greatly magnified scale, of a preferred structural embodiment of the window film of the invention.

The following is a detailed description of preferred embodiments of the invention presently deemed by the inventor to be the best mode of carrying out his invention.

As used in this specification and the appended claims, the following terms have defined meanings:

"Visible radiation" or "light" means electromagnetic radiation having a wavelength of from 380 nanometers to 750 nanometers (nm). (CIE Standard).

"Transparent" and "clear" mean having the property of transmitting visible radiation.

"Visible light transmission" and the acronym "VLT" mean the percentage of visible radiation or light that is transmitted through a transparent optical device, e.g., a clear glass window. (CIE Illuminate C Standard).

"Visible light reflection" and the acronym "VLR" mean the percentage of visible radiation or light that is reflected from an optical device.

"Visible light absorption" and the acronym "VLA" mean the percentage of visible radiation or light that is absorbed by an optical device. In general, the sum of the VLT, VLR and VLA should equal 100%.

"Ultraviolet energy" and the acronym "UV" mean electromagnetic radiation having a wavelength of from about 290 nm to about 380 nm.

"Ultraviolet absorption" and the acronym "UVA" mean the percent of ultraviolet energy absorbed by an optical device or system.

"Near infrared", "near infrared radiation", "near infrared energy" and the acronym "NIR" mean electromagnetic radiation having a wavelength of from about 750 nm to about 1,400 nm.

"Near infrared transmission" and the acronym "NIRT" mean the percent of near infrared energy transmitted through an optical device or system, e.g., a clear glass window.

"Near infrared reflection" and the acronym "NIRR" mean the percent of near infrared energy reflected from an optical device or system.

"Near infrared absorption" and the acronym "NIRA" mean the percent of near infrared energy absorbed by an optical device or system. In general, the sum of NIRT, NIRR and NIRA should equal 100%.

"Shading coefficient" and the acronym "SC" refer to an architectural measure of the efficiency of a window system's solar control capability. It is expressed as the ratio of the solar heat gain through any given window system to the solar heat gain that would occur under the same conditions if the window were made with clear, unshaded, double strength window glass. The lower the shading coefficient, the greater the capacity of the window to control solar energy. (ASHRAE Standard Calculation Method). The clear glass is assigned a value of 1.00. An SC value below 1.00 indicates better heat rejection than single pane clear glass.

"TSER" means "total solar energy rejection" and comprises the total reflectance and absorption of an optical device or system over the entire solar energy spectrum, i.e., the ultraviolet, visible light and infrared spectra.

The above defined solar control properties of window films are, in general, measured with the film affixed to clear, unshaded, double strength window glass.

"Sputter deposit" or "sputter deposited" refers to the process or the product of the process in which a layer of material is deposited onto a substrate by the use of magnetron sputtering apparatus.

Referring now to FIG. 1, a preferred embodiment of the solar control film of the invention is illustrated schematically as being comprised of a substantially transparent, i.e., optically or visually transparent, substrate 10 having thereon an optically transparent thin film coating or layer 12 of one or more reflective metals, an optically transparent layer 14 of laminating adhesive which preferably overlies the metal layer 12, a protective sheet or layer 16 of substantially transparent clear polymer overlying the layer 14, and an abrasion or scratch and wear resistant hard coat 18 covering the exposed surface of polymer 16. A layer 20 of adhesive, customarily pressure sensitive adhesive, is provided on the exposed surface of the substrate 10 for affixing the film to a window.

In the structural embodiment of the invention illustrated in FIG. 1, NIR energy absorbing materials may be embodied in the structure by any one or more of incorporation in or coating onto the substrate 10 and/or the polymer sheet 16, dispersion in the laminating adhesive 14, the hard coat material 18, and/or the pressure sensitive adhesive 20, and/or application as a prime coat under the metal layer 12 and/or the hard coat layer 18.

In a first preferred embodiment of the invention, the NIR energy absorbing material comprises NIR energy absorbing dyes dispersed or dissolved in the layer 14 of laminating adhesive. In a second preferred embodiment, the NIR energy absorbing dyes are incorporated into the polymer sheet 16 or coated onto the side of the sheet 16 that faces the metal layer 12. With either of these embodiments, as is illustrated in FIG. 1, the film is affixed to the interior or room side of a window 22 with the substrate 10 adjacent the window and the NIR energy absorbing material facing away from the window and into the interior of the room or other space.

The substrate 10 may be glass or plastic, rigid or flexible, and may comprise any of the transparent supporting materials conventionally used for solar control film, particularly flexible polymer films supplied in web form and having a thickness from about 1 to about 2 mils up to about 50 mils. The thicker films, in addition to supporting the solar control elements, impart safety features to the window system, particularly, shatter resistance, burglary deterrence, blast and ballistic resistance, and wind damage resistance. Suitable polymers for the substrate 10 include polyethylene terphthalate (PET), polyethylene naptholene (PEN), polycarbonate (PC), polyurethane (PUR), polybutylene (PBN), polyvinyl fluoride (PVF), polyvinylidine fluoride (PVDF) and acrylic. It is preferred that the substrate film be "weatherable", i.e., comprise a film containing ultraviolet absorbers.

The metal layer 12 may comprise any of several reflective metals such as aluminum, silver, gold, copper, chromium and nickel chromium alloys, and may also comprise a metal/metal or metal/metal oxide composite, for example, titanium/silver/titanium or stainless steel/copper/stainless steel. The thickness of the metal film will depend upon the metal or metals selected and the desired levels of VLT and NIRR. Monolayer films would in general have a thickness within the range of from about 20 to about 150 angstroms. Composite film layers would in general have a thickness within the range of from about 5 to about 30 angstroms each. In accordance with the invention, the visible light transmission of the metal layer 12 is at least 50%, preferably more than 50%, for example, 50 to 80%, and more preferably 65 to 75%.

The NIR energy absorbing material preferably comprises one or more substantially transparent NIR energy absorbing dyes. In the first preferred embodiment, the dyes are uniformly dispersed or dissolved in the layer 14 of laminating adhesive. The thickness of the dye-containing layer 14 may suitably be within the range of from about 0.1 to about 1.0 mil. In both the first and the second preferred embodiments, the amount of dye or other NIR absorbent employed is balanced with NIR reflectance to achieve the desired results, as will subsequently be described.

The NIR absorbent material can be designed to cover the entire range of wavelengths within which solar heat is generated, e.g., from about 700 to about 1,400 nanometers. However, in accordance with the invention, and for purposes of efficiency in the cost versus effectiveness ratio, the NIR dyes and the concentration of the dyes are specifically selected and designed to absorb energy within the limited wavelength range of from about 800 to about 1100 nm, inasmuch as the bulk of solar heat, about 71%, is contained within this narrow band.

Preferred NIR absorbing dyes are available from Keystone Aniline, Pacific Division, Santa Fe Springs, Calif. under the tradename "Keysorb" and the grade designations 979, 990 and 993. A preferred concentration of the dyes in the adhesive is 0.5 to 6% based on adhesive solids (BOAS), and more preferably from about 2 to 4%. Relative to a window, the NIRA dye layer is placed to the interior of the metallic layer and the solar energy source. This orientation provides a much more efficient system since the interior is most often climate controlled with air conditioning. The heat that is absorbed is not transferred to the rigid glazing support (window glass) through convection, but is dissipated toward the cooler, interior environment.

The protective sheet 16 may be selected from any of the polymers described above as being suitable for the substrate 10. The scratch and abrasion resistant hard coat 18 may be selected from any of a number of hard coat materials conventionally employed and well known in the window film industry. The hard coat should preferably meet ASTM Standard D1004 and have less than 5% delta haze.

For use in the solar control film aftermarket, i.e., for retrofitting plain glass windows with solar control films, the adhesive 20 is preferably a pressure sensitive adhesive. For original equipment manufacturers in the window/glazing industry (OEMs), the film of the invention may be dry laminated to the glass or other glazing material. In the preferred embodiments, the adhesive contains ultraviolet absorbers meeting the specifications established by the Association of Industrial Metalizers, Coaters and Laminators (AIMCAL). In the OEM manufacture of dual pane glazing systems, the solar control film of the invention is preferably affixed to the inner surface of the outer pane. For single pane and retrofit applications, the film is preferably affixed to the inner surface or room side of the window.

In the described orientation of the film on window glass, solar absorption and solar reflection are controlled to minimize the transfer of solar heat into the glass. Optimization of the balance between the metallic reflecting layer and the contiguous solar heat absorbing layer results in low glass breakage, high TSER, low solar transmission, high visible light transmission and low shading coefficient.

The product is quite simple to manufacture and it is cost effective.

Durability of the product is enhanced through metal layer protection (heat and ultraviolet absorption and reflection), and the use of a weatherable film substrate, an AIMCAL complement of UVA in the mounting adhesive, a protective film layer, and an abrasion resistant hardcoat.

Figure 3:
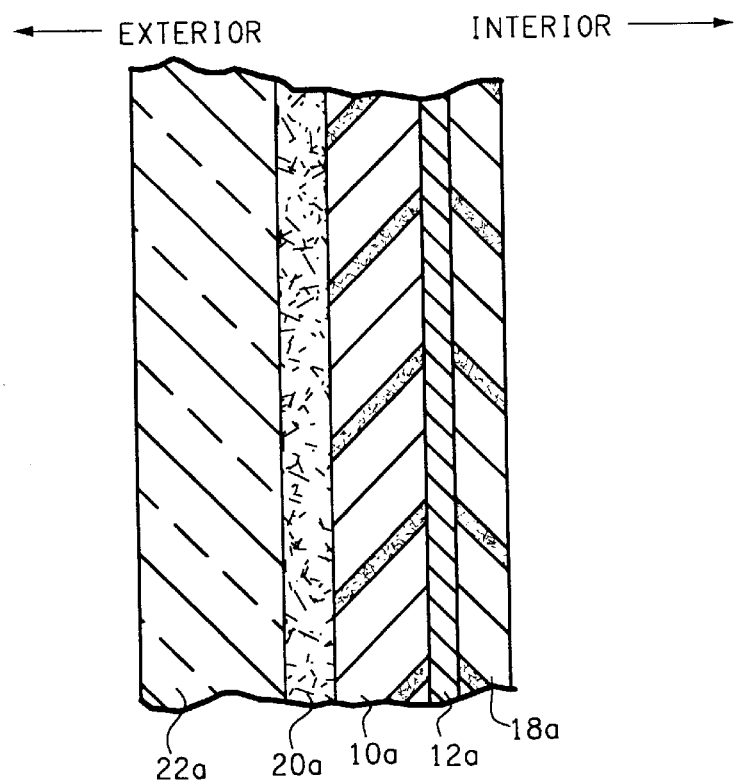
FIGS. 3 and 4 are cross sections, on a magnified scale, of additional structural embodiments of the invention.
Figure 4:
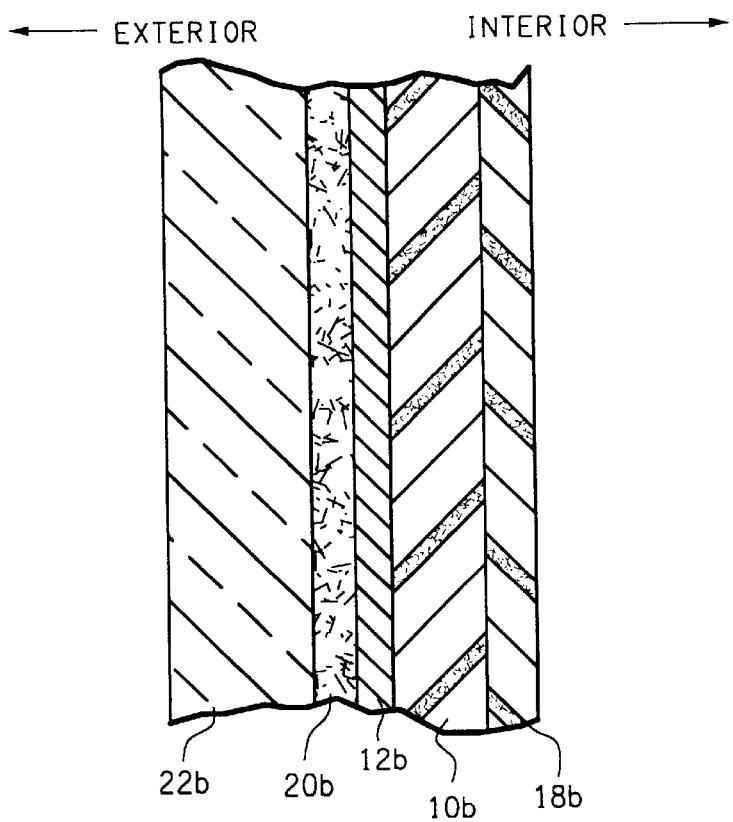

FIGS. 3 and 4 illustrate additional embodiments of the invention in which the polymer sheet 16 and laminating adhesive 14 are omitted from the respective structures. The retained elements are the same as the corresponding elements above described and are indicated by the same reference numerals with the added suffixes "a" and "b" respectively.

In the FIG. 3 embodiment, an optically transparent thin film layer of metal 12a is deposited on a transparent substrate 10a and covered by an optically transparent layer 18a of hard coat material. The non-metallized surface of the substrate 10a is affixed to window glass 22a by a layer 20a of adhesive. NIR absorbing materials are incorporated in the structure by any one or more of dispersion in the adhesive 20a, coating on or incorporation in the substrate 10a, coating over the metal layer 12a, and/or dispersion in the hard coat 18a.

The FIG. 4 embodiment of the invention is comprised of the same elements as the FIG. 3 embodiment, but in this instance the metallized surface 12b of the substrate 10b faces toward and is affixed to window 22b by adhesive 20b. NIR absorbents may be incorporated in the structure in the same manner as in the FIG. 3 embodiment. The FIG. 4 embodiment particularly lends itself to utilization of a substrate 10b coated on its exterior surface with a layer of metal and on its interior surface with a layer of NIR absorbing materials.

In all of its embodiments, the invention is seen to combine the reflecting properties of selected metals and the absorbing properties of specialized near infrared absorbing organic dyes to provide a selected balance between NIRR and NIRA, to minimize NIRT and to maximize VLT. Both of the solar energy filtering media are incorporated into typical coatings and are compatible with existing manufacturing processes. Thickness and concentration are controlled to maximize visible transmission and minimize both total system near infrared transmission and solar heat gain. The invention particularly targets tropical regions, which have the greatest need for solar heat rejection. As a general rule of thumb, the invention may be said to be best suited for regions in which the cost of cooling exceeds the cost of heating.

Figure 2:
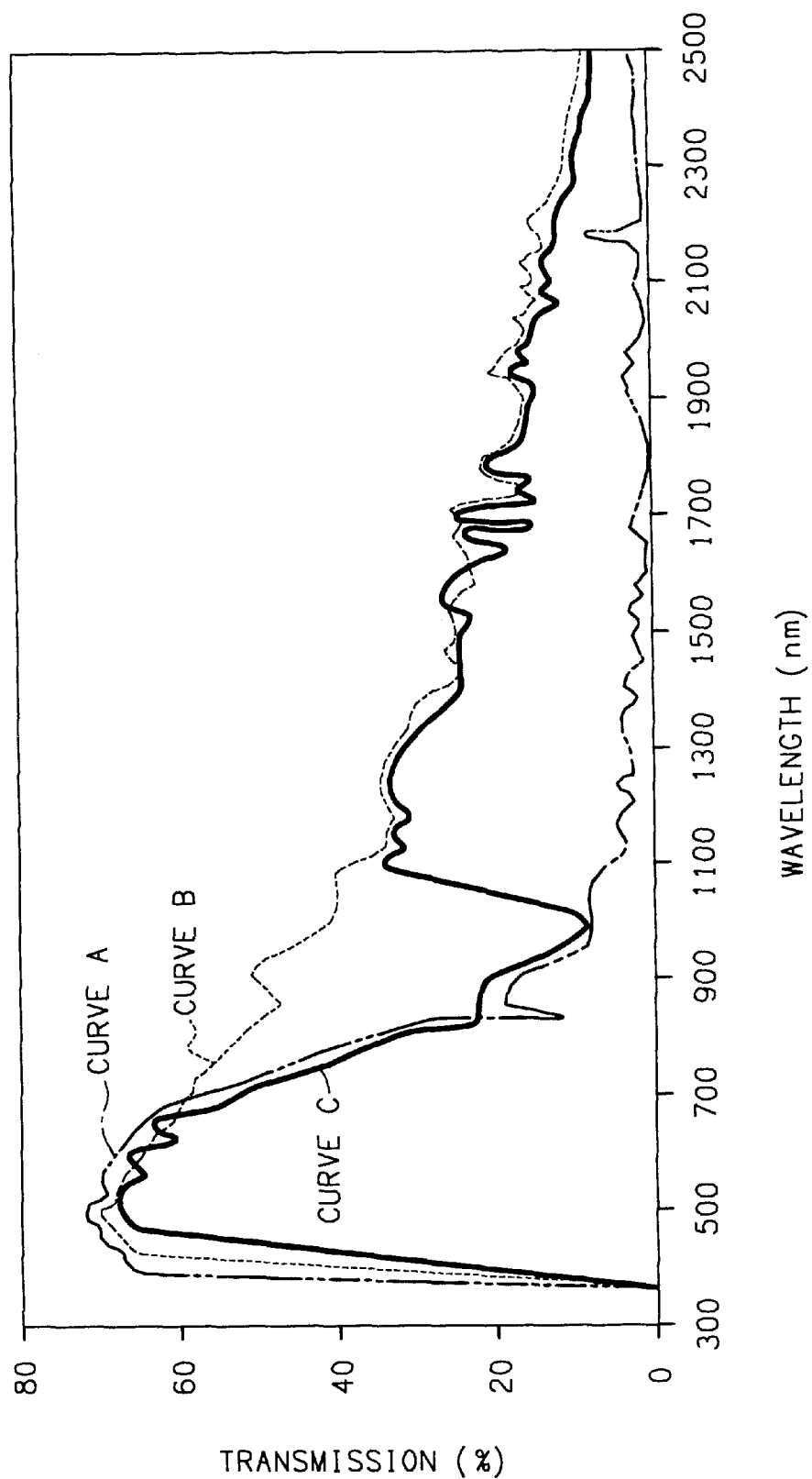
FIG. 2 is a graph comparing solar energy transmission over the entire solar energy spectrum of (A) a heat reflecting solar control film constructed as described in U.S. Pat. No. 4,799,745, (B) a conventional metallized substrate solar control film, and (C) a FIG. 1 preferred embodiment of the solar control film of the invention.

Referring now to FIG. 2, a comparison of the solar energy transmission over the entire spectrum of 300 to 2,500 nm of three solar control films is depicted graphically. All three films were constructed to have, on clear glass, a high VLT, specifically a VLT of about 70%. Curve A depicts in dot-dash lines the solar energy transmission of a solar control window film constructed in accordance with U.S. Pat. No. 4,799,745 which is available from the patent owner, Southwall Technologies, Inc., under the identification XIR-70(Solis); Curve B depicts in dotted lines the solar transmission of a metalized film bearing three layers of metal, i.e., titanium/silver/titanium; and Curve C depicts in solid line the solar transmission of a FIG. 1 preferred embodiment of the film of the invention having NIR absorbing dyes dispersed in the laminating adhesive 14 and utilizing for the substrate 10 and metal layer 12 the same metallized substrate as used to plot Curve B.

As shown by Curve A, the film utilizing a multilayer interference filter construction as disclosed in U.S. Pat. No. 4,799,745 has very low solar energy transmission in the near infrared wavelengths, especially in the range of from about 700 to 1400 nm. Consequently, transmission of solar heat through the window into a room will be low. With a low level of NIRT, one or the other of NIRR and NIRA must be high. As above described, this film has high NIRR and therefore low NIRA, which causes the solar heat energy to be transferred into the glass or other glazing system. Under the ASHRAE standard summer conditions of an exterior temperature of 89° F. and an interior temperature of 75° F., the heat reflected into the glass by the Curve A film cannot readily be dissipated.

As shown by Curve B, a metallized substrate by iteslf has high transmission in the NIR wavelengths of 750 to 1400 nm, averaging about 50% in this invention's target range of 800–1100 nm, where the majority of the solar heat is contained. Consequently, substantial solar heat is transmitted through the window and the film into the interior of the room. Inasmuch as the solar energy rejection of a metal film is inherently by reflection, the conclusion may be drawn that the approximately 50% of solar energy that is not transmitted through the Curve B film in the range of 800–1100 nm is primarily NIRR with very little NIRA.

Curve C illustrates graphically the enhanced performance provided by the present invention. Specifically, as shown by a comparison of Curves B and C, there is a marked decrease in the transmissivity of the Curve C film in the region of 700 to 1100 nm, thereby revealing that the NIRA layer 14 commenced absorbing solar energy at about 700 nm and continued to absorb up to about 1100 nm, thereby decreasing NIRT to a level of from about 5% to about 35% in this range. Inasmuch as the only significant difference between the Curve B film and the Curve C film is the incorporation in the latter of the NIR absorber layer 14, it is apparent that the decrease in NIRT is attributable to NIRA.

Therefore, in the embodiment of the invention represented by the Curve C film, the solar properties of the film in the solar heat wavelength band of 800 to 1100 nm are: NIRT 5–35%, on average about 25%; NIRR 45–60%, on average about 50%; and NIRA 5–35%, on average about 25%. In this manner, a balance is achieved between NIRR and NIRA, and NIRT is decreased. By changing the metal of and/or the thickness of the metal layer 12 and/or by changing the concentration of the absorbing dyes in and/or the thickness of the NIRA layer 14, different degrees of balance between NIRR and NIRA can be attained.

The solar heat absorbed by the NIR absorbing layer 14 is retained within this layer adjacent the interior surface of the film and is not transferred into the glass or other glazing structure. Under ASHRAE summer conditions, the heat absorbed by layer 14 is quite readily dissipated into the air conditioned interior of the room. While this may marginally increase the air conditioning load, it is significantly less costly than running the risk of glass breakage by excessive transfer of heat into the glass.

Pursuant to the invention, NIRR and NIRA are balanced in order to minimize NIRT and solar heat gain, to maximize VLT and to provide a low shading coefficient (SC). The NIRT should be no greater than about 35%, preferably less, and the VLT should be at least about 50%, preferably about 65–75%.

The SC or shading coefficient of the Curve A film and the Curve C film are the same, specifically 0.52. The VLT of the Curve A film (measured per ASHRAE standards) is 72.5%

, whereas the VLT of the Curve C film is 64.2%. The Curve B film has a VLT of 67.1% and an SC of 0.62, which is significantly higher than that of the other two films.

The higher the VLT for a given SC, or the lower the SC for a given VLT, the more efficient a solar control film will be at transmitting visible energy while simultaneously blocking UV and IR. This is referred to as the solar selectivity of a glazing system which exhibits selective transmission spectra across the solar spectrum. By dividing the VLT by the SC, a numeric value (quotient) will be obtained that is herein named the "solar selectivity index" or "SSI". The higher the SSI, the greater the solar efficiency of the system. The SSI of the Curve A film is 1.39 (0.725÷0.52); of the Curve B film 1.08 (0.671÷0.62); and of the Curve C film 1.23 (0.642÷0.52). Again, a comparison of the Curve B and Curve C films reveals a substantial improvement in solar efficiency, without incurring the high cost and the window glass heat gain of the Curve A film.

The water vapor transmission rate (WVTR) of a solar control film is a very important factor in the aftermarket or retrofit segment of the industry. In the retrofit market, the film is applied to the window glass by a pressure sensitive adhesive system and an installation procedure which requires the use of water. In order for the adhesive to dry and permanently affix the film to glass, the water must diffuse through the adhesive and the film to the exposed surface of the film in order to allow for evaporation of the water. Thus, it is important for the film to have a high WVTR in order to dry quickly. The Curve A film has an excessively low WVTR of 0.14 grams per square meter over 24 hours at one atmosphere. In a conventional residential or commercial installation, it may take from 3 to 6 months for the adhesive on the Curve A film to completely dry. During this time, the window may appear foggy or hazy due to retained moisture, and the film may slip or accidentially be moved out of place.

In contrast, the Curve C film has a WVTR of 0.48 grams per square meter over 24 hours at one atmosphere, which compares favorably with more conventional solar control films, such that the adhesive will dry in about 3 to 10 days. Consequently, the potential for the film of the invention (Curve C) to appear foggy or hazy, or to be displaced from the window by slippage or by accident, is greatly reduced compared to the Curve A film. In the preferred embodiments of the invention, the WVTR should be at least about 0.40, preferably greater.

The solar control film of the invention has thus been illustrated to be cost effective and to have a high VLT, a balance between NIRR and NIRA, a low NIRT, low glass solar heat gain, a low SC, a high SSI and a high WVTR. The objects and advantages of the invention have therefore been shown to be attained in a convenient, economical, practical and facile manner.

While certain preferred embodiments of the invention have been herein illustrated and described, it is to be appreciated that various changes, rearrangements and modifications may be made therein without departing from the scope of the invention as defined by the appended claims.

What is claimed is:

1. A solar control window film consisting essentially of a substantially transparent substrate bearing thereon an optically transparent metal coating having selected transmission of visible light and selected reflection of visible light and near infrared energy, and an optically transparent layer comprising near infrared energy absorbing material, said window film on clear glass having visible light transmission of from about 50% to about 80%, near infrared energy reflectance of from about 40% to about 60%, near infrared energy absorptance from about 5% to about 35%, and near infrared energy transmission of from about 5% to about 35%.

2. A window film as set forth in claim 1 wherein the substrate comprises a transparent polymer containing an ultraviolet absorber.

3. A window film as set forth in claim 1 wherein the film has a water vapor transmission rate of 0.4 or more grams per square meter over twenty-four hours at one atmosphere.

4. A window film as set forth in claim 1 wherein the layer comprising near infrared energy absorbing material comprises a protective coating overlying the metal coating.

5. A window film as set forth in claim 1 wherein the near infrared energy absorbing material absorbs energy primarily within the wavelength range of from about 800 to about 1100 nanometers.

6. A window film as set forth in claim 1 wherein the film on clear glass has visible light transmission of from about 65% to about 75% and, on average in the near infrared band of about 800 to about 1100 nanometers, near infrared energy reflectance in the order of about 50%, near infrared energy absorptance in the order of about 25% and near infrared energy transmission in the order of about 25%.

7. A window film as set forth in claim 1 having a shading coefficient in the order of about 0.52 at a visible light transmission of about 65%.

8. A window film as set forth in claim 1 having a solar selectivity index in the order of about 1.23 at a visible light transmission of about 65%.

9. A solar control window film consisting essentially of
a substantially transparent substrate bearing thereon an optically transparent metal coating having selected transmission of visible light and selected reflection of visible light and near infrared energy,
an optically transparent layer of adhesive on one side of the metal coated substrate,
a substantially transparent layer of protective material on the other side of the metal coated substrate, and
near infrared energy absorbing material comprising one or more near infrared energy absorbing substances dispersed in the adhesive or incorporated into or coated onto the substrate or the layer of protective material,
said window film on clear glass having visible light transmission of from about 50% to about 80%, near infrared energy reflectance of from about 40% to about 60%, near infrared energy absorptance from about 5% to about 35%, and near infrared energy transmission of from about 5% to about 35%.

10. A window film as set forth in claim 9 wherein the layer of protective material comprises a clear polymer bearing on its exposed surface a scratch and wear resistant hard coat.

11. A window film as set forth in claim 10 wherein the near infrared energy absorbing material is dispersed in the hard coat.

12. A window film as set forth in claim 9 for application to a window having an exterior surface exposed to solar energy and an interior surface proximate to a space to be protected from solar energy, said layer of adhesive affixing the substrate to the interior surface of the window with the near infrared energy absorbing material proximate to said space.

13. A solar control window film consisting essentially of
a substantially transparent substrate bearing thereon an optically transparent metal coating having selected transmission of visible light and selected reflection of visible light and near infrared energy, an optically transparent layer of pressure sensitive adhesive on one side of the metal coated substrate for adhering the film to a window, a substantially transparent layer of protective material adhesively laminated to the other side of the metal coated substrate, and near infrared energy absorbing material comprising one or more near infrared energy absorbing substances dispersed in either or both of the pressure sensitive adhesive and the laminating adhesive or incorporated into or coated onto the substrate or the layer of protective material, said window film on clear glass having visible light transmission of from about 50% to about 80%, near infrared energy reflectance of from about 40% to about 60%, near infrared energy absorptance from about 5% to about 35%, and near infrared energy transmission of from about 5% to about 35%.

14. A window film as set forth in claim 13 wherein the layer of protective material comprises a clear polymer bearing on its exposed surface a scratch and wear resistant hard coat.

15. A window film as set forth in claim 14 wherein the near infrared energy absorbing material is dispersed in the hard coat.

* * * * *

UNITED STATES PATENT AND TRADEMARK OFFICE
CERTIFICATE OF CORRECTION

PATENT NO.   : 5,956,175
DATED        : September 21, 1999
INVENTOR(S)  : Steven L. Hojnowski It is certified that error appears in the above-identified patent and that said Letters Patent is hereby corrected as shown below:

Title page, item [73], Assignee: should read –MSC Specialty Films, Inc.--

Signed and Sealed this

First Day of February, 2000

Attest:

Q. TODD DICKINSON

Attesting Officer

Acting Commissioner of Patents and Trademarks